C. A. DOUGLASS, F. L. JONES & A. F. HARRIS.
AUTOMATIC WEIGHING MACHINE.
APPLICATION FILED JAN. 12, 1909.
936,613.
Patented Oct. 12, 1909.
3 SHEETS—SHEET 2.
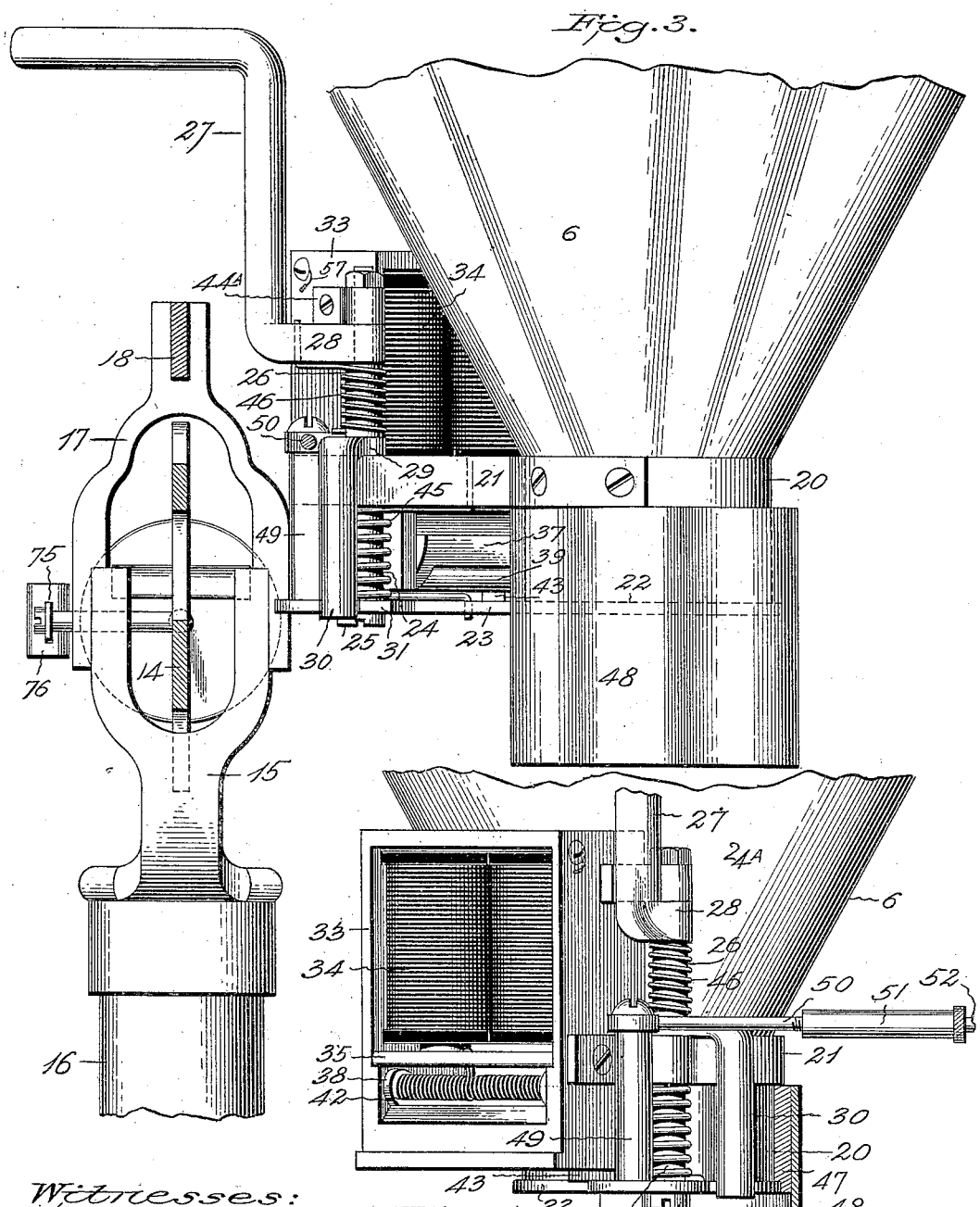

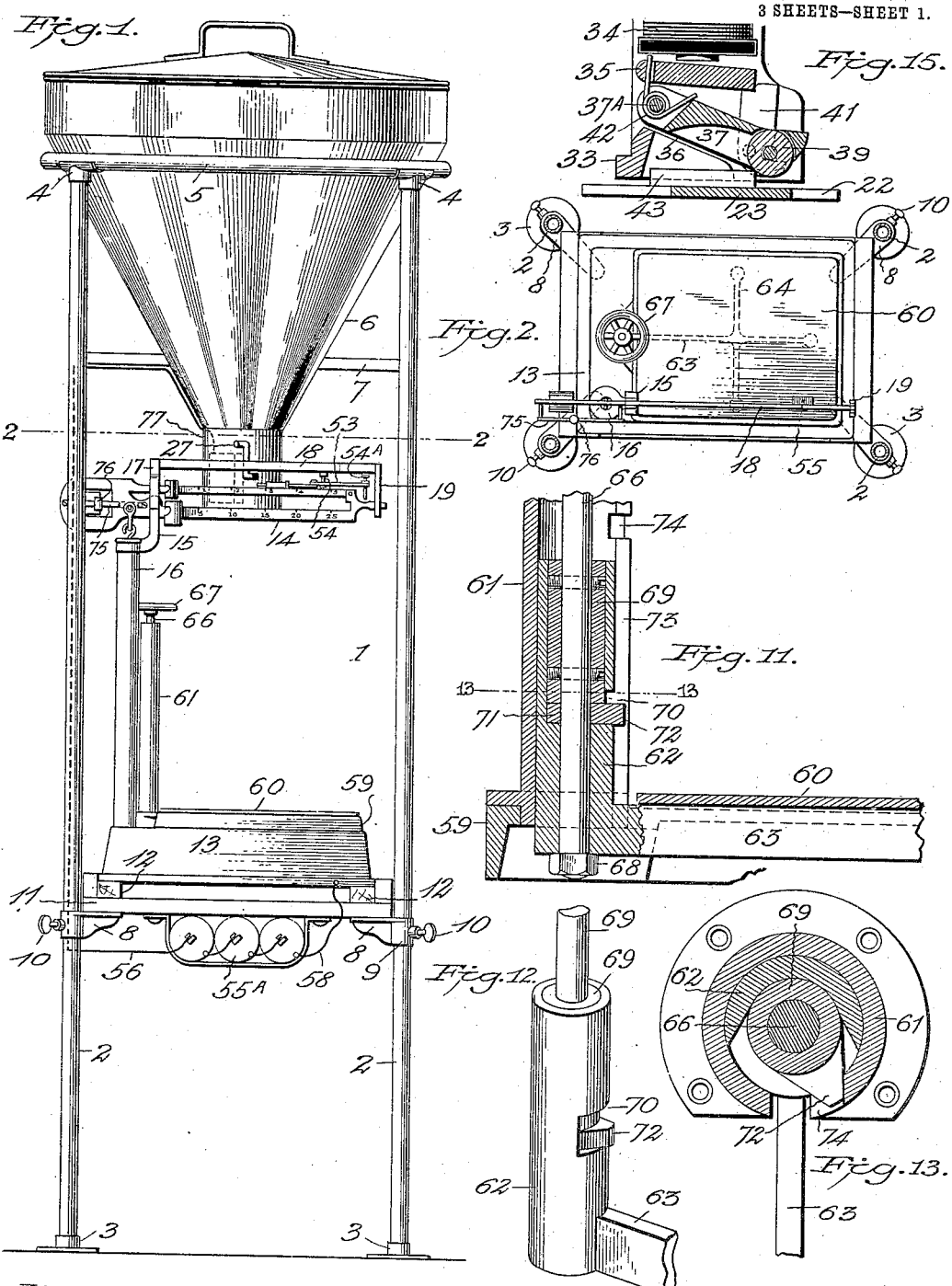

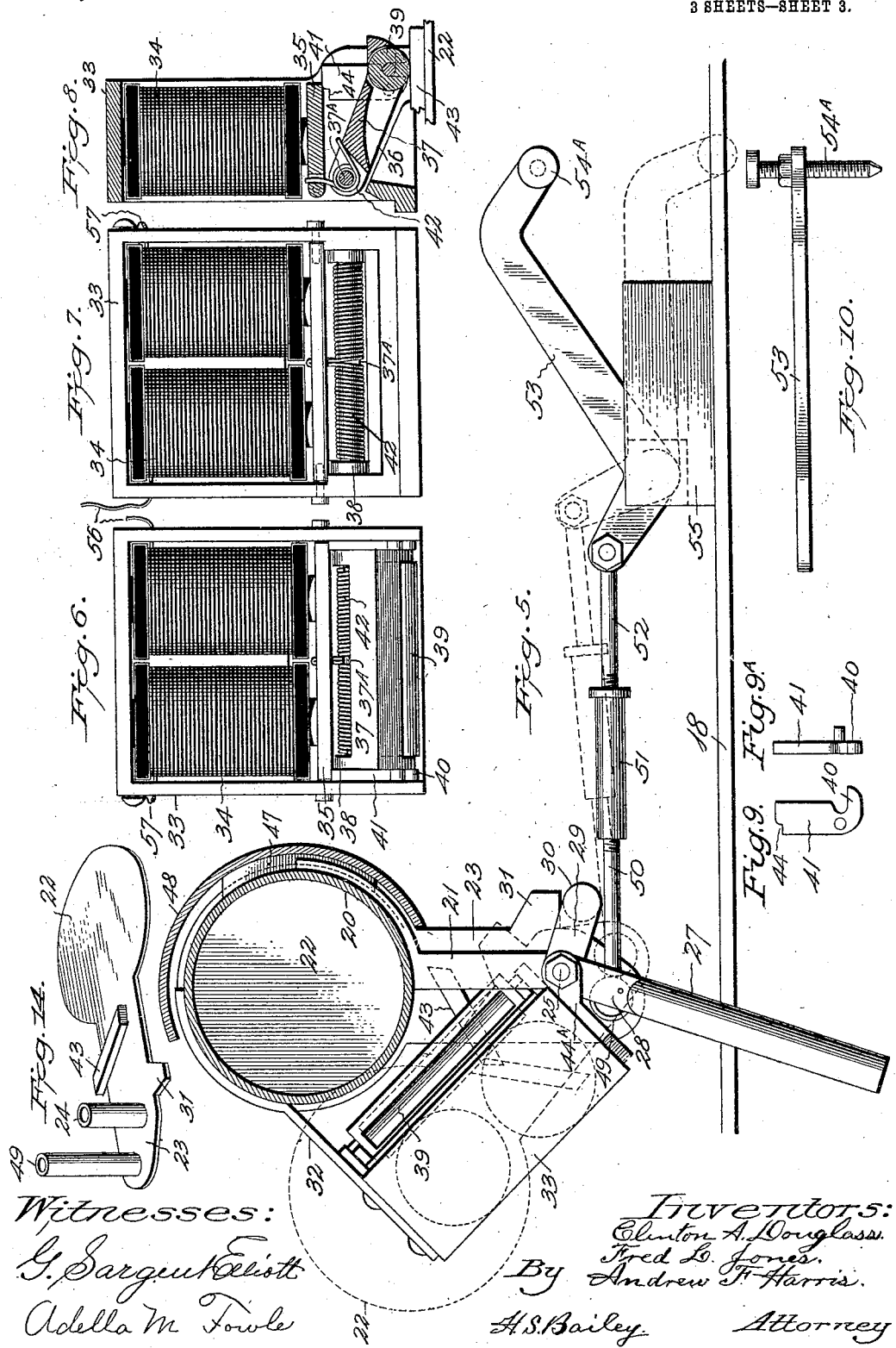

UNITED STATES PATENT OFFICE.

CLINTON A. DOUGLASS AND FRED L. JONES, OF DENVER, AND ANDREW F. HARRIS, OF DOLORES, COLORADO.

AUTOMATIC WEIGHING-MACHINE.

936,613.           Specification of Letters Patent.      Patented Oct. 12, 1909.

Application filed January 12, 1909. Serial No. 471,888.

*To all whom it may concern:*

Be it known that we, CLINTON A. DOUGLASS and FRED L. JONES, residents of the city and county of Denver and State of Colorado, and ANDREW F. HARRIS, a resident of Dolores, county of Montezuma, and State of Colorado, citizens of the United States of America, have invented a new and useful Automatic Weighing-Machine, of which the following is a specification.

This invention relates to improvements in automatic weighing machines, and is designed as an improvement over the style of weighing machine, for which Letters Patent were granted to Clinton A. Douglass and Fred L. Jones on October 1, 1907, No. 867,354.

The object of the invention is to provide a machine of this character, comprising a scale, a hopper supported above the same, and an electrically operated mechanism connected with the scale beam and hopper, for instantaneously cutting off the supply from the hopper, when the required weight has been discharged therefrom. Further, to provide a machine for accurately weighing all commodities of a dry granular nature, and which is arranged to instantly stop the supply to the scale, by means of a spring-controlled cut-off, which is held open by a latch during the discharge from the hopper, which latch is tripped by the closing of an electric circuit, when the scale beam tips at the required weight, the machine being so arranged that the circuit is open at all times when the discharge opening of the hopper is closed, so the scale may be used for weighing other commodities and articles, and thus serve for general weighing purposes, the scale platform being vertically adjustable relatively to the hopper outlet, to properly position sacks of varying sizes beneath the same. These objects are attained by the mechanism illustrated in the accompanying drawings, in which:

Figure 1, is a front elevation of the device, showing the scale and hopper supported in operative relation upon a suitable frame. Fig. 2, is a horizontal, sectional view through the supporting frame, on the line 2—2 of Fig. 1, omitting the hopper and cut-off operating mechanism. Fig. 4, is an end view, full size, and partly in section, showing the lower end of the hopper, with the cut-off, the lever for opening the same, and the latch mechanism for holding it open, together with the scale beam and a portion of its supporting standard. Fig. 4, is a front elevation, full size, of the parts shown in Fig. 3, omitting the scale beam and its support. Fig. 5, is a plan view, partly in section and full size, of the parts shown in Figs. 3 and 4, with the addition of the lever which is swung into the path of the scale beam, when the cut-off is opened. Fig. 6, is an elevation, full size, of the magnet and latch operated thereby, for holding the cut-off open, and for releasing the same to close the hopper outlet. Fig. 7, is a similar view, taken from the opposite side of the magnet. Fig. 8, is a vertical, sectional view, through the magnet frame, armature and latch. Fig. 9, is a side view of one of the latch-operated dogs, which normally hold the armature in contact with the magnet poles. Fig. 9$^A$ is an edge view of the same. Fig. 10, is an edge view of the lever, which is swung into the path of the scale beam, when the cut-off is opened, having a screw with which the beam contacts when tipped, to close an electric circuit through the magnet, and thereby release the cut-off to close the hopper outlet. Fig. 11, is a vertical, sectional view through the lower portion of the scale platform raising and supporting mechanism, on an enlarged scale relatively to Figs. 1 and 2. Fig. 12, is a perspective view of the platform raising device, detached from the tubular supporting standard. Fig. 13, is a horizontal sectional view, full size, on the line 13—13 of Fig. 11. Fig. 14, is a perspective view of the cut-off. And Fig. 15, is a sectional view of the latch and a portion of the magnet, showing the latch in position to hold the cut-off open.

Referring to the accompanying drawings, the numeral 1, indicates a supporting frame, comprising four uprights 2, which, as shown, are sections of pipe, upon the lower ends of which flanged sockets 3 are screwed, and the sockets are secured to a floor or platform, as the case may be, while the upper ends of the uprights are provided with T-couplings 4, which support a band or section of pipe 5, bent into circular form, in which is held a conical hopper 6, as clearly shown in Fig. 1, the hopper being held rigid by a bar 7, which is secured to it and to two of the uprights. Brackets 8, are secured to the uprights, at a suitable distance from the floor, and these brackets have hubs 9, which are slipped over the uprights and secured thereon by thumb screws 10, which pass through the hubs and contact with the uprights. These brackets are all adjusted to the same level, and upon them is secured a platform 11, which, with the brackets, may be adjusted vertically by means of the set screws 10. Strips 12, of wood or any other suitable non-conducting material, are secured adjacent to the ends of the platform 11, and upon these strips is placed a scale 13, of the platform type, having the usual double beam 14, pivotally mounted in a bracket 15, secured upon an upright standard 16, on the scale frame. The bracket 15, has a vertical extension 17, to which one end of a horizontal arm 18, is secured, the other end of which carries a short depending guide member 19, having a slot through which the forward end of the scale beam passes. This guide prevents lateral movement of the forward end of the beam, for a purpose to be hereinafter explained.

In the lower end of the hopper is secured a short piece of tubing 20, of suitable diameter, approximately two inches, to which is rigidly secured one end of an arm 21, which extends toward the scale beam, and at right angles thereto. The tubing 20, forms the outlet of the hopper, and its lower end is normally closed by a cut-off plate 22, which is pivotally secured to the arm 21. The cut-off comprises a substantially circular portion of slightly greater diameter than the outlet tube, and a tail 23 extending from the circular portion, which is provided near its outer end with a vertical tube or sleeve 24, which extends to and abuts against the under side of the arm 21. A headed pin 25, passes up through the tail, sleeve, and arm 21, and through a vertical hub portion 26, of a hand lever 27; and from the upper end of this hub portion extends a short horizontal member 28, from which extends an upright portion, which terminates in an outwardly extending handle. From the lower end of this hub portion extends a short horizontal member 29, at right angles to the upper horizontal member 28, and this member 29 terminates in a downwardly projecting stem 30, which is adapted to contact with a lug or projection 31, on the adjacent edge of the tail 23, of the cut-off, which is thereby opened, when the handle is turned, as will fully appear hereinafter.

An arm 32, is secured to the outlet tube 20, opposite the arm 21, and the outer end of the arm 21, inclines to one side, to lie parallel with the arm 32, and between the latter arm and the inclined end of the arm 21, is rigidly secured a rectangular frame 33, in which is mounted a magnet 34, an armature 35, in operative relation to the magnet, and a latch 36, comprising an inclined plate 37, which is hinged at its outer and upper edge, by a pin 37$^A$, which passes through ears 38, on the outer corners of the said outer edge, and through the sides of the frame 33, and a roller 39, which lies in a recess in the inner and lower edge of the plate, and which has trunnions which project through the opposite walls of the recess, and rest upon projections 40, at the lower ends of a pair of dogs 41, which are pivoted to the sides of the frame 33, the pivots being on the same plane with the roller trunnions, and back of them. A coil spring 42, surrounds the pin 37$^A$, and the wire from which the spring is made, is first bent centrally to form a tongue, from each side of which a coil is formed, as shown in Fig. 7, the terminal ends of which exert a tension in the same direction, while the tension of the tongue is exerted in the opposite direction. The two end terminals bear upon the outer edge of the plate, while the central tongue extends through a hole in the armature, in line with its pivotal point. The tendency of this spring is to press the inner edge of the plate downward, but the plate is held normally at a predetermined inclination, by a ridge or bar 43, on the cut-off tail 23, upon which the roller 39 normally rests. One end of this bar extends beyond the edge of the tail, so as to lie beneath the roller, and the other end terminates at a point on the tail that will pass and be directly behind the roller, when the cut-off is opened to the position shown in dotted lines in Fig. 5.

In the normal position of the plate and roller, the dogs 41, are held in a vertical position, by the roller trunnions, and the upper ends of the dogs support the armature and hold it up against the magnet poles; but when the cut-off is opened, and the inner end of the bar 43 passes the roller, the spring 42 swings the plate 37 downward, and the roller trunnions pressing upon the projections 40 of the dogs 41, cause them to rock on their pivots, and release the armature, the free end of which drops into notches 44, formed in the upper ends of the dogs, and locks them in this position, so that the roller cannot be raised until the armature is attracted, and releases the dogs. When the plate is thrown down by the action of its spring, the roller lies in front of the inner end of the bar 43, and the cut-off is held open.

The horizontal portion 29, of the cut-off lever 27, rests upon the top of the arm 21, and the pin 25, which passes through the hub portion of this lever, is held at its upper end against lateral movement, by passing through a lug or ear 44$^A$, which is formed upon or secured to the adjacent side of the frame 33. This ear rests upon the horizontal portion 28 of the lever, and in conjunction with the arm 21, prevents vertical movement of the lever. A nut is screwed upon the end of the pin 25, and against the said ear, whereby the pin is held in place.

When the latch 36, releases the cut-off, the same is thrown to its normal or closed position by a coil spring 45, which surrounds the sleeve 24 on the tail of the cut-off; the upper end of said spring being secured to the arm 21, while its lower end is secured to the said tail. After the cut-off is opened by engagement of the lever stem 30, with the lug 31, as the lever is turned, it is essential that the lever be restored to its normal position before the cut-off is released, so as not to be thrown violently around to this position by the engagement of the said lug 31, with the stem 30, as the cut-off closes, and this is accomplished by a coil spring 46, which surrounds the hub 26, of the lever, one end of which spring is suitably secured to the lever, while the opposite end is secured to a convenient fixed member, such as the arm 21, or the adjacent side of the frame 33. Thus, when the lever is turned and the cut-off opened until it is engaged and held by the latch, the lever is automatically restored to its normal position, by the spring 46, so that its stem 30 is out of the path of the lug 31, as the cut-off closes.

An abutment block 47, is secured to the outlet tube 20, to receive the impact of the cut-off, and a semi-circular plate or shield 48 is secured to this block, which prevents portions of the discharging material from being thrown to one side by the cut-off as it closes.

The tripping of the latch to release the cut-off and close the hopper outlet, is accomplished in the following manner: Upon the outer end of the cut-off tail is secured a vertical post 49, to which is pivotally attached one end of a connecting rod, comprising a rod 50, the opposite end of which is threaded and enters one end of a sleeve 51, which is oppositely threaded at the other end, and a rod 52, one end of which enters the remaining end of the sleeve, while the other end is pivotally secured to a bell crank lever 53, which is pivoted to a pin 54, which is screwed into a fiber block 55, or one of any other suitable non-conducting material, which is secured to the arm 18, above the scale beam. The free end of the lever 53 terminates in a short arm, through which a terminal contact screw 54$^A$ passes, the end of which is adapted to stand above and adjacent to the outer end of the scale beam, when the lever 53 is moved to the position shown in dotted lines, Fig. 5, by the opening of the cut-off, so that when the scale beam is tipped, it will contact with the said screw to form an electric circuit through the magnet, and a battery or series of batteries 55$^A$, whereby the latch is operated to release the cut-off, which is instantly closed by its actuating spring 45.

The batteries 55$^A$ are secured in any suitable manner to the under side of the platform 11, and are connected by wires in the usual manner. An insulated wire 56 extends from the positive pole of the first battery, up through one of the tubular standards 2, and connects with one pole of the magnet, being insulated from the frame 33, while a wire 57 from the other pole, connects with the frame 33, and as this frame and the mechanism for operating the cut-off are connected and are all metal, they form a conductor, which terminates in the contact screw 54$^A$. A wire 58 connects the negative pole of the last battery with the scale frame, which forms a conductor, having the end of the scale beam as a terminal. Thus, when the cut-off is open, and the lever 53 is in the position shown in dotted lines, Fig. 5, the end of the scale beam when tipped contacts with the terminal screw 54$^A$, whereby a circuit is formed through the batteries and magnet, by the wires and conductors above specified, the armature is attracted, and the dogs 41 released. The roller 39 is now free, and the pressure of the end of the bar 43 upon it under the action of the spring 45, lifts it and permits the cut-off to close.

The platform 59 of the scale, rests upon the scale levers in the usual manner, and an auxiliary platform 60 rests upon the platform 59, and is adapted to be raised above it, so as to elevate smaller sacks or bags, which are employed, and bring their mouths immediately below the discharge outlet, and this auxiliary platform is attached to the main platform and operated in the following manner:

A tubular standard 61, of any suitable height, is secured to or formed upon one end of the main platform centrally of its width, and a post 62, is inserted in the lower end of the standard, having a projecting arm 63, which extends nearly the length of the platform, upon which a cross arm 64 is formed, and upon these arms is secured the auxiliary platform 60. A rod 66, passes through the post and out through the top of the standard 61, and is provided with a hand wheel 67, the post being supported upon a nut 68, which is screwed on the lower end of the rod. The upper half of the post is tubular, and surrounds a short tube 69, which is secured to the rod by screws. A recess or opening 70, is formed in the post at the bottom of its tubular portion, and upon the lower end of the tube 69, is welded or otherwise secured a metal disk 71, having a projecting latch portion 72, which extends out through the opening 70, and into a slot 73, which extends from the lower end of the standard to within a short distance of its upper end. One wall of this slot is provided at intervals with notches 74, which are adapted to receive the latch 72, and to adjust the platform 60 to the required height, the hand wheel 67 is grasped, and the platform lifted until the latch 72 registers with the desired notch, when by turning the wheel the latch is moved into the notch, and the platform held at the desired point.

In order to secure the disk 71 to the end of the tube 69, the disk is first inserted in the opening 70, and the rod is passed down through it until the tube 69 rests upon the said disk, and the opening is sufficiently large to permit the operation of securing the disk by soldering or welding.

The operation of the improved weighing machine is as follows: The hopper is supplied with any suitable commodity, such as sugar, rice, coffee or the like, and to weigh out any desired amount, the poise is moved on the beam to the number corresponding to the number of pounds required, a sack is placed on the platform below the discharge outlet, and the lever 27 is turned to open the cut-off, which is held open by the engagement of the bar 43 on the cut-off tail with the latch roller 39. This movement of the cut-off rocks the lever 53, in the manner before described, so that its terminal screw 54$^A$ stands directly above the end of the scale beam. The material from the hopper then discharges into the sack, and when the scale beam tips, its outer end contacts with the terminal 54$^A$, and a circuit is formed through the magnet and batteries, whereby the armature 35 is attracted, releasing the dogs 41, and permitting the roller 39 to move out of the path of the bar 43, which allows the cut-off to be closed by its spring 45. At the instant the circuit is formed, and the supply cut off from the hopper, the amount of material in the sack would, with the ordinary scales, correspond to the exact weight required, and the amount in mid-air would constitute over-weight, and with an out-let as large as the one illustrated, the over-weight would be considerable, and in order to provide for this, and secure the exact weight, the rear portion of the scale beam is provided with an auxiliary beam 75, carrying a compensating poise 76, by the proper adjustment of which the beam will be caused to tip before the actual amount required has entered the sack, but the amount in mid-air, at the instant the outlet is closed, will exactly equal the difference between the amount in the sack, and the exact weight required. Thus, by a careful adjustment of the poise 76, the over-weight can be provided for, and as it is always the same, at the instant the cut-off closes, the exact weight in any number of pounds may be ascertained.

The magnet and cut-off are preferably surrounded by a casing 77, which protects them from dust and other foreign substances. This casing is secured around the hopper, adjacent to its lower end.

Having described the invention, what we claim as new and desire to secure by Letters Patent, is:

1. In a weighing machine, a scale, a hopper above the scale having an outlet, and a cut-off for normally closing the outlet; a lever for opening the cut-off, and means for restoring the lever to its normal position; an electrically operated latch in circuit for holding the cut-off open; a contact at one terminal of the circuit, a contact on the scale beam which engages the first contact, when the beam is tipped to close the circuit, whereby the latch is tripped, and the cut-off released, and a spring for closing the cut-off.

2. In a weighing machine, a scale; a hopper supported above the scale, having an outlet; a pivoted cut-off which normally closes the outlet; a lever for opening the cut-off and means for restoring the lever to its normal position; a magnet in an electric circuit including the scale beam, and an armature for the magnet; a latch for holding the cut-off open and means connecting the latch and armature; a contact on the scale beam, representing one terminal of the circuit; a contact above the first contact, representing the other terminal, said contacts being caused to engage when the beam is tipped, whereby a circuit is formed which trips the latch and releases the cut-off; a spring for closing the cut-off, and means for simultaneously opening the circuit with the closing of the cut-off.

3. In a weighing machine, the combination with a scale, a hopper supported above the scale, having an outlet; a pivoted cut-off for the hopper, and a lever for opening the cut-off; of means for holding the cut-off open for a predetermined period, comprising a magnet, and an armature in circuit with a battery; a latch connected with the armature and a terminal contact which is moved to a position above the scale beam simultaneously with the opening of the cut-off, by which a circuit is formed when the beam is tipped, whereby the latch is tripped, and the cut-off released, and means for closing the cut-off, whereby the said terminal contact is moved away from the scale beam, and the circuit broken.

4. In a weighing machine, a scale, a hopper above the scale, having an outlet; a cut-off pivotally secured to the hopper, which normally closes its outlet; means for opening the cut-off; a latch for holding it open; a magnet and armature in circuit with a battery; means connecting the latch and armature; a terminal contact adjacent to the scale beam; means connecting said contact with the cut-off, whereby it is moved to a position above the beam, when the cut-off is opened, to form a circuit by contact with the said beam, when the same is tipped, whereby the armature trips the latch and releases the cut-off; a spring for closing the cut-off, and an abutment for receiving the impact of the cut-off, the said terminal being moved to open the circuit, as the cut-off closes.

5. In a weighing machine, the combination with a scale and a hopper supported above the scale, having an outlet; of an arm on the hopper; a cut-off pivoted to the arm, which normally closes the outlet; a lug on the cut-off; a hand operated lever pivoted to the arm, having a depending end which engages the said lug, whereby the cut-off is opened when lever is turned; a latch for holding the cut-off open; means for tripping the latch simultaneously with the tipping of the scale beam, and a spring for closing the cut-off.

6. In a weighing machine, the combination with a scale, a hopper above the scale, a cut-off for the hopper, a lever for opening the cut-off, and a latch for holding the cut-off open, of electrically operated means, for automatically tripping the latch to release the cut-off, when the scale beam is tipped; means for restoring the lever to its normal position after the cut-off is opened, and a spring for closing the cut-off.

7. In a weighing machine, the combination with a scale, a hopper above the scale; a cut-off for the hopper, a lever for opening the cut-off, and a latch for holding the cut-off open, of means for tripping the latch to release the cut-off, when the beam is tipped, comprising a magnet, an armature in operative relation to the magnet and connected with the latch; a battery; circuit wires connecting the battery with a pole of the magnet, and with the scale frame, and an electrical connection between the other magnet pole and the cut-off; an arm secured to the scale standard above the beam; a fiber block secured to the arm, a bell crank lever pivotally attached to the said block, having a terminal contact screw at one end; and a rod connecting the bell crank with the cut-off, whereby when the cut-off is opened the contact is shifted to stand above the scale beam to form a circuit by contact with the beam when the same is tipped, whereby the magnet is energized, the armature lifted and the latch tripped, and a spring for closing the cut-off.

8. In a weighing machine, the combination with a scale, a hopper above the scale; a pivoted cut-off for the hopper having a tail portion, a bar on said tail portion, and a lever for opening the cut-off, of a latch for holding the cut-off open, comprising a frame, a plate hinged within the frame, having a roller in its free end, which normally rests upon the said bar, and having projecting trunnions; a magnet; an armature in operative relation to the magnet; pivoted dogs which normally hold the armature against the magnet poles, and having notches in their upper ends and projections at their lower ends upon which the roller trunnions rest, and a spring for exerting a downward pressure upon the roller plate whereby to depress the plate when the cut-off is opened to position the roller in front of the said bar, and rock the dogs to drop the armature into the said notches, whereby the roller is held in front of the bar; and means for closing an electric circuit through the magnet when the scale beam is tipped, whereby the armature is withdrawn, the latch tripped, and the cut-off released, and a spring for closing the cut-off.

9. In a weighing machine, the combination of a scale, a hopper supported above the scale, having an outlet; an arm attached to the hopper above the outlet; a cut-off for the outlet pivoted to the arm, having a tail portion; an arm above the scale beam and secured to the beam-supporting standard; a non-conducting block on the arm; a bell crank pivoted to said block, having a terminal contact at its outer end; a rod connecting the bell crank with the cut-off forward of its pivotal point; a lever for opening the cut-off; a latch for holding the cut-off open, and electrically operated means in a circuit, including the scale beam and bell crank, for tripping the latch, said bell crank being rocked by the opening of the cut-off, to position its terminal contact above the end of the scale beam, whereby a circuit is formed when the beam tips, and the latch is tripped to release the cut-off, and a spring for closing the cut-off.

10. In a weighing machine, the combination with a frame, a scale mounted on the frame; a hopper mounted on the frame above the scale; a cut-off for the hopper; a lever for opening the cut-off, a latch for holding it open; means connected with the latch and scale beam for releasing the latch when the beam is tipped, and a spring for closing the cut-off, of an auxiliary platform for the scale; a standard on the main platform; a rod extending through the standard; a post in the lower end of the standard, upon the rod, having a projecting arm which supports the auxiliary platform; and a latch projecting from the post, which is adapted to engage notches formed at intervals upon the standard, to hold the auxiliary platform at a desired point above the main platform.

11. In a weighing machine, the combination with a hopper, a scale below the hopper, a spring-actuated cut-off for the hopper, a lever for opening the cut-off, a latch for holding it open, and means connected in an electric circuit with the scale beam for tripping the latch when the beam is tipped; of a tubular standard on the scale platform; a post in the lower end of the standard, having an arm, the upper portion of the post being tubular; an auxiliary platform on said arm; a rod connected with the post and extending up through and beyond the top of the standard, and provided with a hand hold, the standard being provided with a vertical slot having a series of notches in one of its walls; and a latch secured to the rod, within the tubular portion of the post, having a projection which extends through a recess at the bottom of the tubular portion, adapted to engage the said notches when the rod is lifted and turned, thereby to hold the auxiliary platform at a desired point above the main platform.

12. In a weighing machine, the combination with a scale and a hopper supported above the same, of a cut-off, for the hopper, consisting of a circular plate having a tail portion; a lug on the tail portion; a sleeve on the tail portion; an arm extending from the hopper; a lever resting upon the arm; a pin extending through the said sleeve, arm, and lever; a depending stem upon the lever adapted to engage the lug when the lever is turned, whereby the cut-off is opened; a latch for holding it open, and electrically operated means connected with the scale beam, whereby when the beam is tipped a circuit is formed, and the latch tripped to release the cut-off.

13. In a weighing machine, the combination with a scale; an arm secured above the scale beam; a non-conducting block on said arm; a bell crank pivoted to said block having a terminal contact screw in one end; a hopper above the scale; a cut-off pivoted to normally close the hopper outlet; an extensible rod connected to the cut-off and to the bell crank, and means for opening the cut-off, whereby the bell crank is rocked to position the contact screw above and adjacent to the scale beam; a latch for holding the cut-off open, and an electrically operated tripping device, in circuit with the bell crank and scale beam, whereby the cut-off is released, when a circuit is formed by the tipping of the beam, said bell crank being rocked in the opposite direction when the cut-off closes, to break the circuit.

In testimony whereof we affix our signatures in presence of two witnesses.

CLINTON A. DOUGLASS.
FRED L. JONES.
ANDREW F. HARRIS.

Witnesses:
G. SARGENT ELLIOTT,
ADELLA M. FOWLE.